United States Patent
Fletcher et al.

[11] 3,984,671
[45] Oct. 5, 1976

[54] OPTICAL PROCESS FOR PRODUCING CLASSIFICATION MAPS FROM MULTISPECTRAL DATA

[76] Inventors: James C. Fletcher, Administrator of the National Aeronautics and Space Administration, with respect to an invention of Richard E. Haskell, Rochester, Mich.

[22] Filed: Aug. 30, 1974

[21] Appl. No.: 502,138

[52] U.S. Cl. .................... 235/181; 340/146.3 P; 340/146.3 Q
[51] Int. Cl.² .................... G06F 15/34; G03H 1/28; G02B 27/38
[58] Field of Search .............. 235/181; 340/146.3 F, 340/146.3 G, 146.3 MA, 146.3 D, 146.3 P, 146.3 Q; 343/5 CD, 5 CM, 5 SA, 5 DP, 5 MM, 5 SC, 6

[56] References Cited
UNITED STATES PATENTS

| | | | |
|---|---|---|---|
| 3,400,363 | 9/1968 | Silverman | 235/181 |
| 3,565,565 | 2/1971 | Reid | 340/146.3 P |
| 3,600,054 | 8/1971 | Gabor | 340/146.3 P |
| 3,602,887 | 8/1971 | Chow | 340/146.3 P |

OTHER PUBLICATIONS

Moore et al.: Imaging Radars for Geoscience Use, IEEE Transactions on Geoscience Electronics, vol. –July 1971 p. 155–164.
Kedar et al.: Applications of the Discriminant Function in Automatic Pattern Recognition of Side–looking Radar Imagery, Conference Proceedings of the Society of Photo–Optical Instrumentation Engineers Seminar on Imaging Techniques, Los Angeles Feb. 1972 145–148.
Wagner et al.: The Remote Identification of Terrain Features and Materials at Kansas Test Sites, Interim Report NTIS CSCL–08M N74–18068.
Gramenopoulos: Automated Thematic Mapping and Change Detection of ERTS–A Images N74–30679.

Primary Examiner—Jerry Smith
Attorney, Agent, or Firm—Marvin J. Marnock; John R. Manning; Marvin F. Matthews

[57] ABSTRACT

A method of producing single-class and multi-class composite classification maps from multispectral data is provided. The multispectral data is transformed into a binary matrix format which is then encoded on an optical medium such as photographic film. The encoded data is holographically correlated with coded patterns representing selected spectral signatures to produce signal-class classification maps. Several single-class maps are optically superimposed to produce multi-class composite classification maps.

11 Claims, 12 Drawing Figures

OPTICAL PROCESS FOR PRODUCING CLASSIFICATION MAPS FROM MULTISPECTRAL DATA

FIELD OF THE INVENTION

The present invention relates to a method of producing single-class and multi-class composite classification maps from multispectral data.

BACKGROUND OF THE INVENTION

As ever increasing quantities of digital multichannel data are generated through the use of such multispectral scanners as the four-channel scanner on the ERTS-1 satellite, the S192 thirteen-channel scanner on Skylab, and numerous aircraft scanners including the Bendix Corporation's 24-channel scanner, the need for improved processing capabilities has become critical. The current methods of processing this data use a maximum likelihood pattern recognition program such as LARSYS II. While such a program provides an optimum classification scheme, at least in the sense of minimizing the cost of misclassification, the computer processing time required to produce a classification map increases substantially as the number of channels of data increases. When digital pattern recognition techniques are applied to the processing of terrain classification data for extended areas, the cost of processing all of the data becomes prohibitive. As a consequence, in such cases it is practical to process only a small fraction of the data that is acquired. Although grey maps or color composites for a single channel can readily be made from such "screened" data, these maps cannot be made to include any information contained in the multispectral nature of the data.

SUMMARY OF THE INVENTION

The disadvantages of the prior art are substantially overcome by the method of the present invention wherein multispectral data is transformed from an n-bit integer format into a binary matrix format, encoded on photographic film, and holographically correlated with coded patterns representing a particular spectral signature to produce single-class classification maps. Several different single-class maps are then optically superimposed to produce multi-class composite classification maps.

The method of the invention provides a much larger data processing capability because:

1. Inherent in the use of optical holographic correlation techniques is the capability of simultaneous parallel processing of data. For example, the method of the invention will allow the data from a scanner containing well over a million ground resolution elements (each element individually containing up to 25 and more separate channels of data) to be processed and classified simultaneously.

2. The optical encoding techniques of the invention by which the transformed data is encoded on photographic film allow a higher data packing density to be achieved than is possible on magnetic tape. These techniques will allow 25 channels of data for one million resolution elements to be encoded on about one square inch of film.

3. Packing density is further increased by the coding scheme used to transform the data, which usually results in a reduction in the number of bits of information by a factor of two to a factor of eight.

Other features and advantages of the invention will be set forth in, or apparent from, the detailed description of the preferred embodiments found hereinbelow.

DETAILED DESCRIPTION

Figure 1:
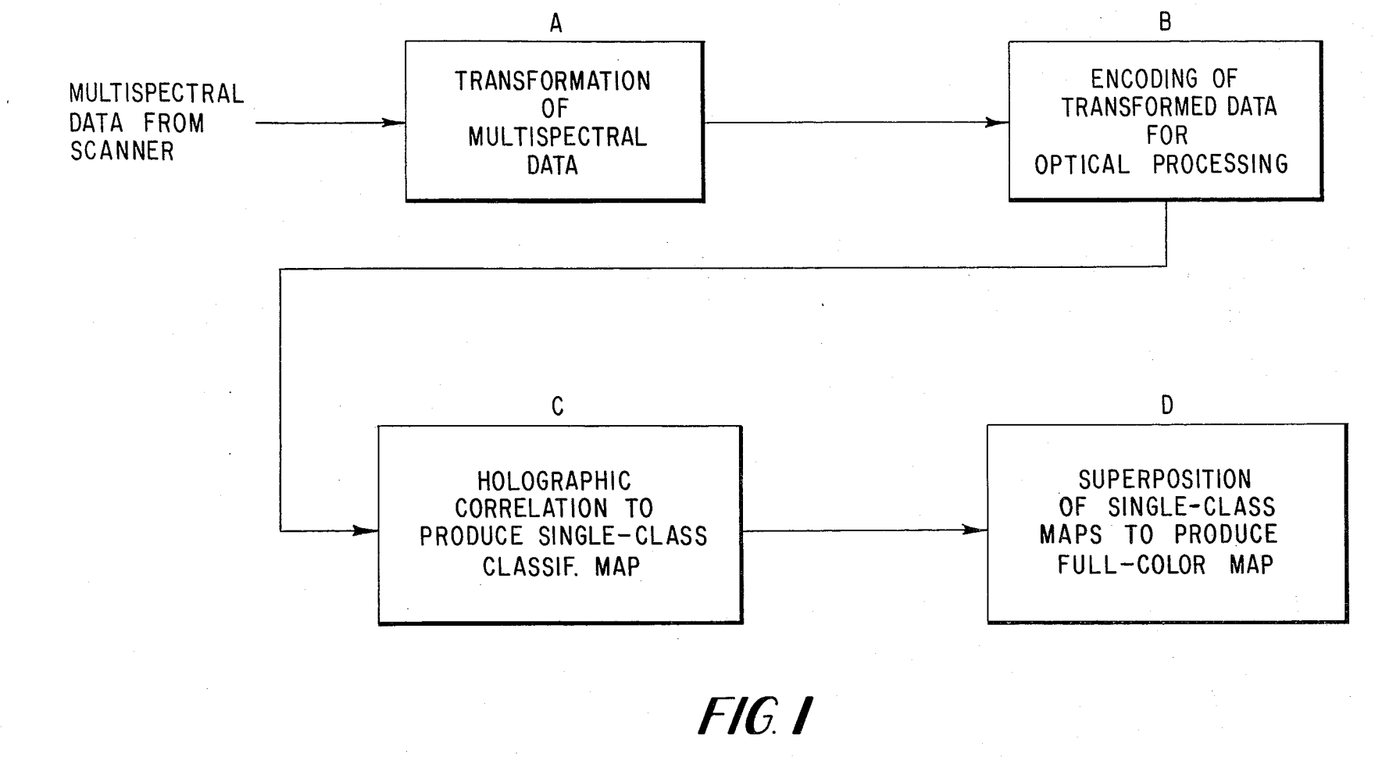
FIG. 1 is a block diagram representation of the steps in a method in accordance with a preferred embodiment of the invention for producing multi-class composite classification maps.

Referring to FIG. 1, a block format illustration is provided of the basic steps of the optical process in accordance with the invention whereby classification maps are produced from multi-spectral data. The first two steps, represented by Blocks A and B, result in the transformation of the spectral data generated by the multispectral scanner, which is generally stored on magnetic tape in an 8-bit integer format, into a binary matrix format encoded on photographic film. In the final two steps, represented by Blocks C and D, the transformed data is holographically correlated with coded binary matrix formats representing particular spectral classes, or "signatures", to produce single-class classification maps, and these single-class maps are then optically superimposed to produce a full-color multi-class classification map.

Figures 2, 9:
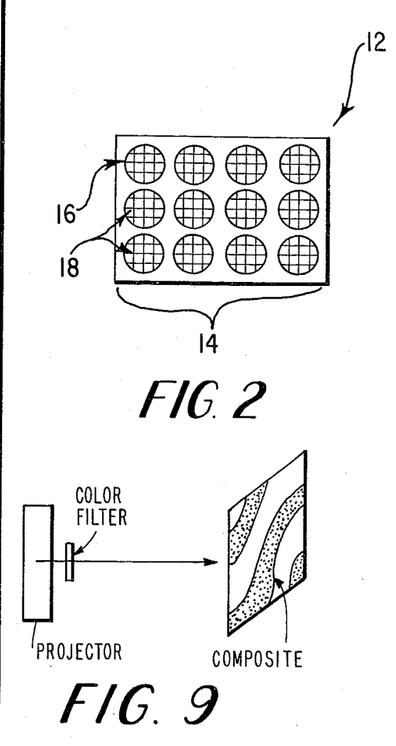
FIG. 2 is a highly schematic representation of a multispectral scanner.

In order to understand the transformation and encoding steps, it is helpful first to consider the original format of the multispectral data. Referring to FIG. 2, a schematic representation is provided of the pertinent structural features of an illustrative multispectral scanner, generally denoted 12. Reference is made to Skylab A EREP User's Handbook, NASA-S-72-831-V, for a complete description of a representative scanner, the Skylab S192. Scanner 12 measures the reflectance from a particular ground resolution element, denoted 16, simultaneously in each of N different spectral bands. The reflectance measurement of a single ground resolution element 16 is thus divided into N separate channels, which are denoted 18, and each of these N measurements is typically quantized as an integer in the range of 0 to 255. These N measurements are typically stored on magnetic tape as 8-bit integers. The scanner 12 then sequentially scans a line of contiguous resolution elements, called a scan-line and denoted by 14, and records N channels of data for each resolution element 16 that is scanned. The scanning is done perpendicular to the line of flight of the scanner 12 and the recording of successive scan-lines 14 produces data for all ground resolution elements 16 that are in the flight path.

Assuming the integers referred to are available for processing on magnetic tape, as is the current practice, the first step of the invention is to transform the integers, using a classification scheme to be described below, into a binary format which is susceptible to encoding on photographic film by a technique which also is to be described more fully below. It should be noted that an alternative embodiment, which will not be described in detail, but which employs a laser scanner linked directly to the multispectral scanner 12, allows the multispectral data to be recorded directly on the photographic film without first having to record the data on magnetic tape. However, while such an embodiment simplifies processing, it does not permit the production of classification maps with different spectral sensitivities from the same data, such as is permitted by the preferred embodiment now being described.

Figure 3A:
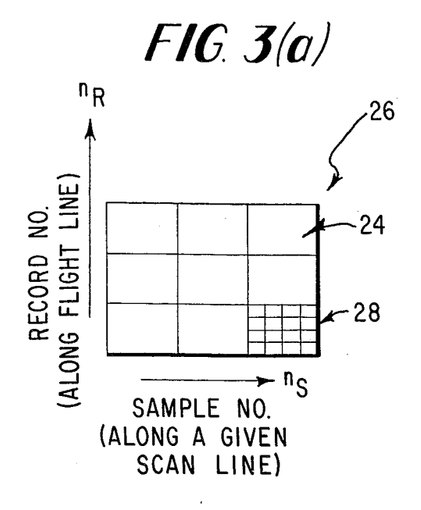
FIGS. 3(a) and 3(b) illustrate the format of the data which is transformed in accordance with the method represented in FIG. 1, FIG. 3(b) being a detail of FIG. 3(a)
Figure 3B:
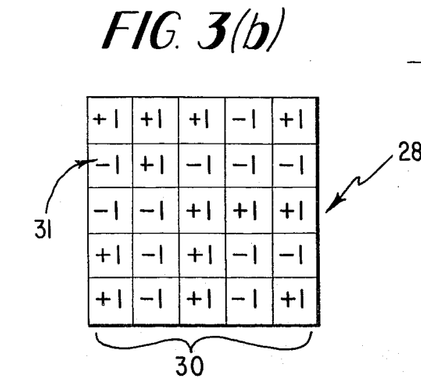

FIGS. 3(a) and 3(b) illustrate the ultimate format of the transformed data. The binary matrix equivalent of the digital integers previously referred to for each resolution element 16 in a series of scan lines 14 in a computer memory device is resolution cells 24 of a matrix 26. The location of the transformed data for a particular resolution element 16 in matrix 26 corresponds to the physical location of that element in a map of the ground area covered by the data. Within each of the resolution cells 24 corresponding to a particular element 16, the transformed integers for all of the N channels 18 are coded in a sub-matrix, which is denoted 28 and which contains a particular quasi-random $n \times n$ array 30 of $\pm 1$'s, such as shown in FIG. 3(b). The integer for each channel 18 may be represented by one or more of these binary $\pm 1$'s, depending on the classification scheme chosen. In all cases, N, the number of channels 18 of data, is less than or equal to $n^2$, $n^2$ representing the number of sub-cells 31 in sub-matrices 28. A particular arrangement of the $\pm 1$'s in array 30 is characteristic of a particular spectral "signature", the various features of the earth's surface each having its own spectral signature. As indicated earlier, the classification scheme by which the 8-bit integers are transformed to the binary matrix format of array 30 will be discussed more fully below, but for present purposes, it is noted that the scheme is designed such that a given array 30 of $\pm 1$'s has a high correlation (in the sense of the sum of the bit-by-bit multiplication of the binary +1's and −1's) with other arrays 30 representing similar spectral signatures while at the same time having a low correlation with all other arrays 30 representing dissimilar spectral signatures.

Once the integers referred to above have been transformed into the binary matrix arrays 30 in the sub-matrices 28, the next step is to encode matrix 26 (with its sub-matrices 28 of $\pm 1$ arrays 30) onto an optical input medium such that the amplitude transmittance, with respect to coherent light, of the input medium is $\pm 1$ for each sub-cell 31 of sub-matrix 28, depending on whether the sub-cell 31 contains a +1 or −1 in array 30. Any encoding method which achieves this result is suitable although preferred methods are described hereinbelow with reference to FIGS. 4(a) and 4(b).

Figure 4A:
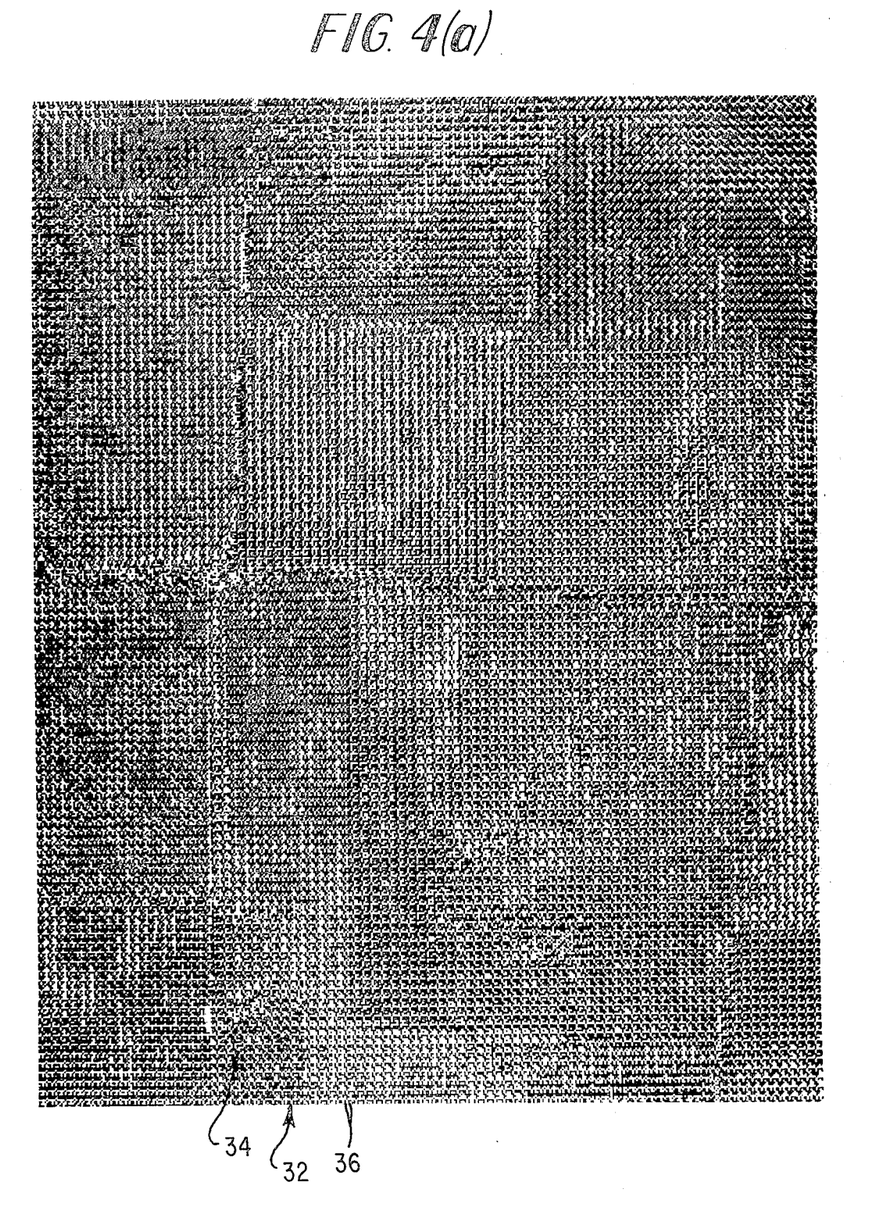
FIG. 4(a) illustrates the format of the data for a 12-channel, 50 × 50 resolution element multispectral scanner which has been transformed and optically encoded in accordance with the method represented in FIG. 1.
Figures 4B, 7:
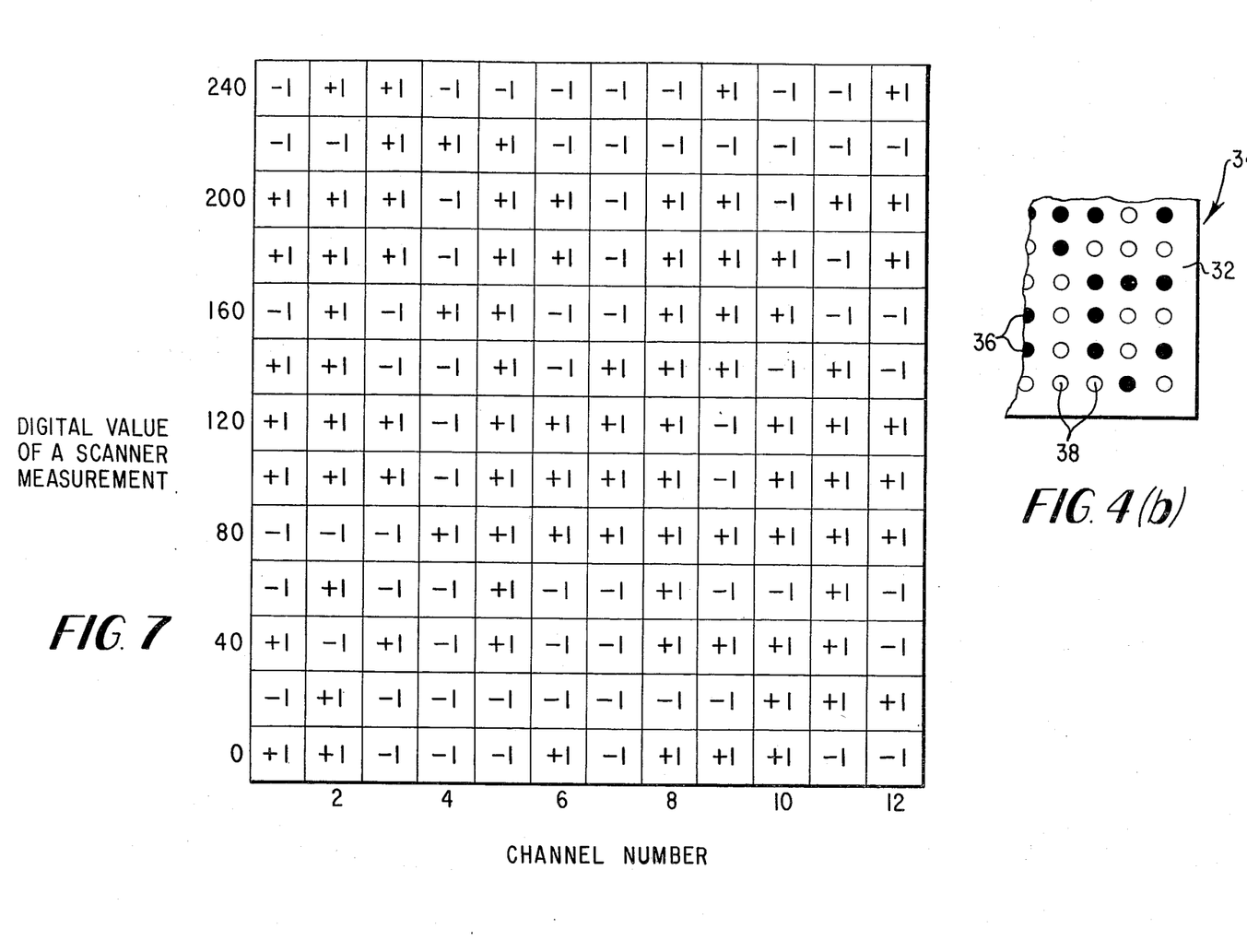
FIG. 4(b) is an exemplary detail of the pattern of FIG. 4(a)
FIG. 7 is a representation of an illustrative 12-channel look-up table used in the transformation step of one embodiment of the method represented in FIG. 1.

Referring to FIG. 4(a), one preferred method of encoding the information contained in the binary matrix format onto an optical input medium is illustrated. FIG. 4(a) illustrates an example of the encoding of a 50 × 50 matrix 26 which has 5 × 5 sub-matrices 28 corresponding to a 12-channel scanner 12. The encoding is achieved by means of selective exposure of photographic film 32 by a computer-controlled cathode-ray tube in a manner which results in a matrix pattern 34 of dot-like exposures corresponding to the +1 sub-cells 31 of sub-matrices 28. A laser scanner system can also be used to expose film 32. When film 32 is developed, the exposed dot-like regions, or dots, 36 of matrix pattern 34, corresponding to the +1 sub-cells 31 of sub-matrices 28, are opaque with respect to the unexposed areas corresponding to the −1 sub-cells 31. In FIG. 4(b), which is a detail of a portion of pattern 34, corresponding to a single resolution cell 24 of a sub-matrix 28 of the matrix 26 illustrated in FIG. 4(a), exposed regions or dots 36 are black and the unexposed regions of film 32 represents dots 38 are white. The developed film 32 is then bleached producing a totally transparent optical medium in the unexposed regions. The bleaching is controlled so as to produce a relative phase shift of $\pi$ radians between a coherent light passing through a +1 region representing dot 36 and a −1 region representing dot 38. In this way the amplitude transmittance of the resulting bleached film 32 is equal to +1 in the original exposed regions 36 and is equal to −1 in the unexposed regions 38.

Alternatively, in accordance with a further preferred embodiment of the invention, the difference between a +1 region and a −1 region can be achieved by varying the position of an exposed dot within a sub-cell 31 of a sub-matrix 28. This corresponds to the so-called detour-phase method used in computer generated binary holograms. While this detour-phase method requires no bleaching of the film, the method described above that utilizes bleaching will provide at least four times the packing density of the method utilizing detour-phase. For example, with the bleaching method a laser scanner system with $5\mu$ resolution could encode 25 channels of data for one million resolution elements on about one square inch of film. Moreover, use of such a laser-scanner system would allow the use of real-time input media, such as thermoplastic films, in place of photographic film 32, to store the zero and $\pi$ phase information.

After multispectral scanner data has been optically encoded into a binary matrix pattern 34 on an appropriate input medium, the data is ready for the final two steps of the invention, to wit, holographically correlating the pattern 34 with various coded, single-cell correlation patterns, which are similar to the portion of pattern 34 corresponding to a single resolution cell as shown in FIG. 4(b), but which have a pattern of dots which represent specified signatures, thereby producing single-class classification maps. Several single-class maps are then optically superimposed to produce a full-color multi-class classification map.

Figure 5A:
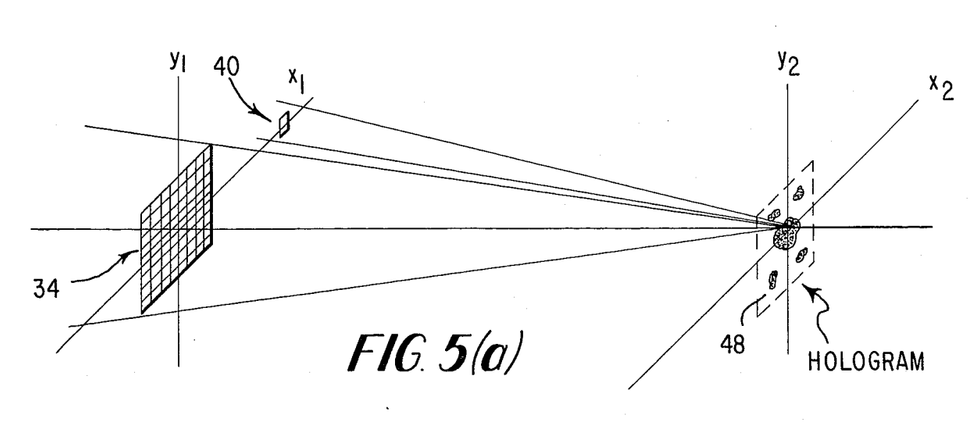
FIGS. 5(a) and 5(b) are diagrammatic perspective views of the basic elements utilized in the recording phase and the reconstruction phase, respectively, of one embodiment of the holographic correlation step of the method of FIG. 1.
Figure 5B:
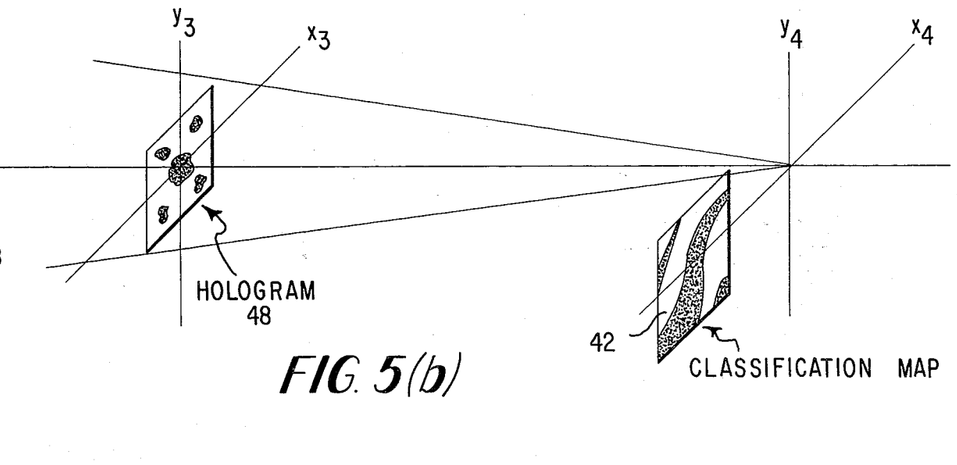
Figure 6A:
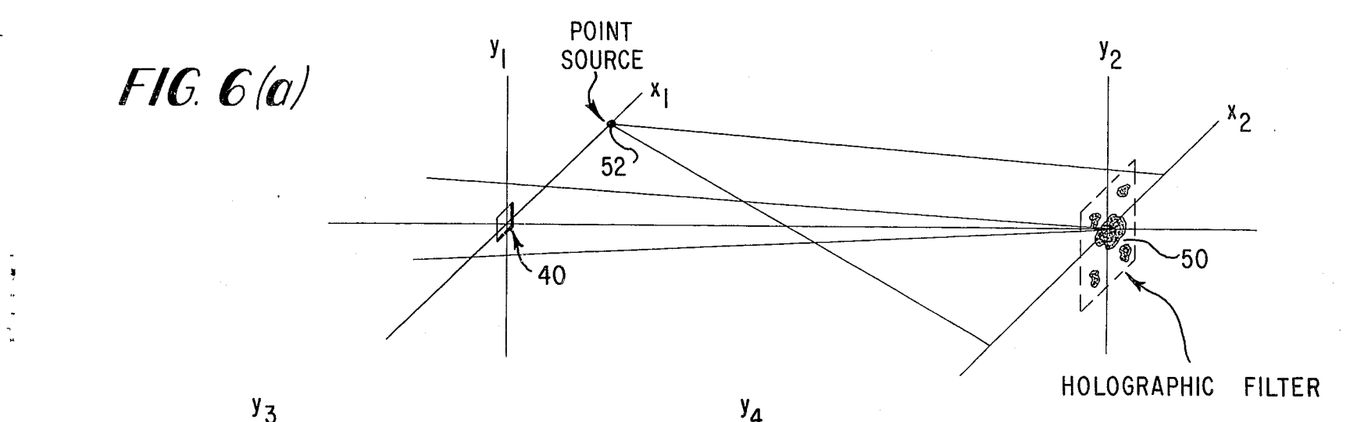
FIG. 6(a) is a diagrammatic perspective view of the basic elements utilized in producing a holographic filter used in a further embodiment of the holographic correlating step.
Figure 6B:
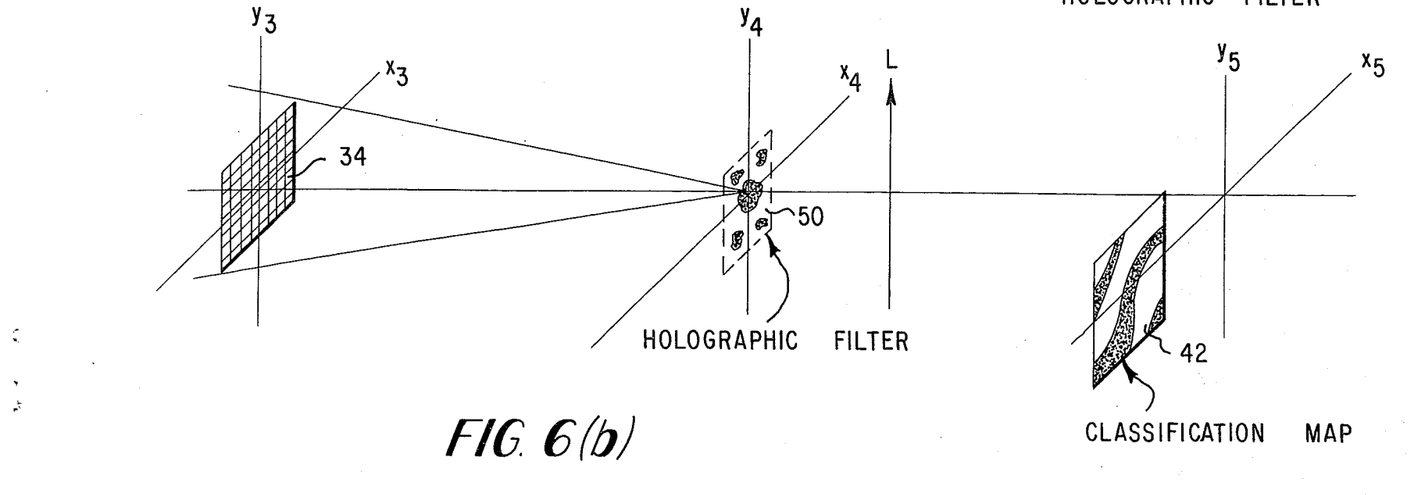
FIG. 6(b) is a diagrammatic perspective view of the basic elements utilized in the further embodiment of the holographic correlating step.

Referring to FIGS. 5(a), 5(b), and 6(b), two methods of holographic correlation are schematically illustrated. FIGS. 5(a) and 5(b) illustrate a two-step system. In the first, recording step, illustrated in FIGS. 5(a), input media containing a binary matrix pattern 34 and a single-cell correlation pattern 40 are placed in a first plane $x_1 - Y_1$ of a beam of coherent light from a suitable source (not shown) that converges to a focus in a second plane $x_2 - Y_2$. A hologram 48 of the resulting interference pattern is formed in the second plane $x_2 - Y_2$. Using the detour-phase method of encoding described above, hologram 48 is formed at a location centered at the first diffraction order in the plane $x_2 - Y_2$. If the laser-scanning method of encoding described above is used, hologram 48 is centered on the optical axis in the plane $x_2 - Y_2$.

In the second step, illustrated in FIG. 5(b), hologram 48 is placed in a third plane $x_3 - Y_3$ of a beam of coherent light from a suitable source (not shown) that converges to a focus at a fourth plane $x_4 - Y_4$. A single-class classification map 42 for the spectral signature whose correlation pattern 40 is used to make hologram 48 appear as a two-dimensional image displaced along the $x_4$ axis in the plane $x_4 - Y_4$. Map 42 has a format corresponding to that of pattern 34 with a dot of light occurring at the center of each area representing a resolution cell 24 (sub-matrix 28) of matrix 26, the brightness of the dot being proportional to the correlation of that particular cell area of pattern 34 with the single-cell correlation pattern 40.

Referring to FIGS. 6(a) and 6(b), a single-step real-time system is represented, which utilizes a hologram 50 as a filter. As shown in FIG. 6(a), the filter hologram 50 is produced by placing a correlation pattern 40 at the origin of a first plane $x_1 - Y_1$ of a beam of coherent light which converges to a focus at a second plane $x_2 - Y_2$. A point light source 52 located along the $x_1$ axis provides a reference wave that interferes with the diffraction wave of the correlation pattern 40. The resulting hologram 50 is recorded in the $x_2 - Y_2$ plane, either on the optical axis or displaced along the $x_2$ axis depending on whether the bleaching or the detour-phase method of encoding, respectively, is used. The pattern 34 is placed in the $x_3 - Y_3$ plane of a beam of coherent light that converges to a focus at the $x_4 - Y_4$ plane. The distances $z_2$ between the $x_3 - Y_3$ and the $x_4 - Y_4$ planes are identical to the distance $z_1$ between the $x_1 - Y_1$ plane and the $x_2 - Y_2$ plane if the same scales were used to encode patterns 34 and 40. It may be more convenient to use a larger scale for patterns 40 when making the corresponding filter holograms 50. If this is done, the difference in scales can be compensated for by making $z_2$ less than $z_1$. The filter hologram 50 for a particular class is placed in the $x_4 - Y_4$ plane, either on the optical axis or displaced along the $x_4$ axis to the first diffraction order, again depending on whether the cathode ray tube or laser-scanning method of encoding is used. In either case a lens L placed beyond the $x_4 - Y_4$ plane is used to image the $x_3 - Y_3$ plane onto the $x_5 - Y_5$ plane, resulting in the appearance of classification map 42 in the $x_5 - Y_5$ plane displaced along the $x_5$ axis. Classification maps 42 for different classes are obtained merely by inserting different filter holograms 50 representing the different classes or spectral signatures into the $x_4 - Y_4$ plane.

At this stage of the process, maps 42 represent single-class classifications. If these maps 42 are photographed on high-gamma photographic film with controlled development, then only light dots with intensities above some threshold $C_{min}$ value representing a minimum cross-correlation will expose the film. Above this threshold, and within a defined range, the dots will expose the film in proportion to their intensities. By developing the film with a reversal process or by two-stage contact printing (not illustrated), the brightness of each spot resulting from the projection of the developed film through an image projector (not shown) will be a measure of the confidence that the data contained in resolution cell 24 belongs to the same class as that represented by the correlation pattern 40 used to produce the classification map 42 from which the projected map is produced.

Full-color multi-class classification maps (not shown) are readily produced by projecting the developed film for each of several different single-class maps 42 through a different color filter (not shown) for each map 42 to produce colored projection maps, and by superimposing these colored projection maps to produce a full-color multi-class map. This last step of the process may be advantageously accomplished using commercially available multiple image projectors with different color filters. In such a multi-class map any resolution cell 24 that was classified in the correlation step as correlating with more than one of the spectral classes represented by the correlation patterns 40 used to produce the single-class maps 42, will be represented by a projected light spot whose color is the result of the optical combination of the colors used to represent each single-class map 42. For example, if red, green, and blue filters are used to superimpose three different single-class maps, representing for example the spectral signatures of wheat, corn, and oats, respectively, then any resolution cell 24 that correlated highly with both the red "wheat" class and the green "corn" class results in a yellow light spot. However, if a resolution cell 24 correlates highly with only the red wheat class, resulting in a bright red spot for a single-class projection map, and correlates only marginally with the green corn class, resulting in a dim green spot, upon superimposition, a reddish-yellow spot is produced.

Thus, different crops, such as soybeans, for example, will have spectral signatures that are correlated to varying degrees with the signatures of wheat, corn, and oats. Thus, in each of the three classification maps made for wheat, corn, and oats, the areas representing soybeans will have a different "grey" level in the resulting single-class projection map. In the final full-color composite map, soybeans will be represented by a particular combination of red, green, and blue and might appear, for example, as dark yellow. Consequently, all regions in the composite map will have a color that is characteristic of a particular spectral signature.

The particular form of the full-color map will depend to some extent on the particular choices of the spectral classes used to make the holographic correlation single-class maps 42. These classes may or may not correspond to spectral data actually viewed by particular ground resolution elements 16. However, classes should be chosen which are as mutually uncorrelated as possible, and which correlate highly with the data of a significant number of resolution elements 16. The best method for selecting the three classes that will produce the best single-class and composite classification maps will vary with the particular application for which the maps will be used.

The final multi-class classification map will be a full-color map in which resolution cells 24 that have similar spectral signatures over a large number of channels 18, that is, appear the same over a wide spectrum, produce spots which have the same color. As stated, by using high gamma photographic film and controlling the development of the film so that only light dots have light intensities above a minimum threshold value representing a minimum cross-correlation will expose the film, single-class and multi-class classification maps with different spectral sensitivities may be produced. For example, one multiclass map would differentiate between agricultural and forest areas, but would not distinguish different agricultural crops in agricultural areas or different timber species in forest areas. Another multi-class map, with a higher sensitivity, would distinguish specific crops or specific timber species. Moreover, as also was mentioned above, above the threshold referred to and over a particular range, the light dots can be made to expose the film in proportion to their intensities and thus if the film is developed using one of the processes referred to and projected through a color filter, the brightness of each color spot will, as stated, be a function of the degree to which the corresponding resolution element belongs to the particular class in question.

An integral part of the transformation steps referred to above is the classification scheme whereby the integers referred to above are converted to the binary array 30. In order to facilitate understanding of the classification scheme, manipulation of the integers by appropriate computer hardware will be described by reference to mathematical analogies. Basically, the transformation of the digital integers to a binary array 30 of ± 1's is accomplished by plotting the digital value (on a scale of 0 to 255) of the integer in each channel 18 as a function of the channel number on a matrix graph, the size and location of whose cells depends on the particular statistical strategy used to classify the data. A detailed discussion of three strategies is provided in Haskell, "A Correlation Method for Processing Multispectral Data," NASA Report No. ISC 08011. In accordance with a preferred embodiment of the invention a strategy is employed which provides "unsupervised" classification of the integers 20 by means of clustering, in which K cells of uniform size are assigned to each channel, with the possibility that K, the number of cells, may vary from channel to channel. As an example, FIG. 7 illustrates the case of 12 channels in which the matrix contains 13 cells for each channel. A value of +1 or −1 is then assigned to each cell at random with equal probability, as shown in FIG. 7. In this format, the matrix graph is known as a look-up table. If the data were to be classified by means of computer hardware, instead of by the holographic correlation described above, the following operations would be performed: A row vector is formed for each resolution element which contains a number of elements equal to the number of channels 18, the value of each element of the row vector is either +1 or −1, depending on the value of the cell in the look-up table corresponding to the value of the integer for each channel. The row vectors are then correlated with vectors deemed to be characteristic of a particular spectral signature. In an unsupervised classification scheme, the correlation is achieved in the following manner: The spectral signature obtained from the first resolution element 16 deemed to be a reference signature, called Class 1, and its corresponding row vector $T_1$, is stored. A signature from a second resolution element 16 is then measured and its corresponding row vector S is formed. A scalar integer correlation sum C is then obtained by forming the inner products of vector S with the transpose (corresponding column vector) of reference vector $T_1$. Sum C is compared to some minimum value $C_{min}$ and if sum C is greater than $C_{min}$, then the signature from this second resolution element 16 is also assigned to Class 1. Otherwise the signature is deemed to be another reference signature, called Class 2, and its corresponding row vector $T_2$ is also stored for future comparisons. This procedure is repeated for subsequent resolution elements 16; viz. forming a vector S(J), computing the correlation sum C and comparing it with previously stored reference vectors T(M), assigning the signature for the element 16 to the Class M yielding the largest correlation which exceeds $C_{min}$, or otherwise creating a new class. The total number of clusters into which the data (the integers referred to) will classify themselves depend on the initial selection of the values for the number of cells in each channel and the value of $C_{min}$. A number of possibilities exist for an adaptive program that will vary the number of cells/channels and/or $C_{min}$ until the data are classified into a predetermined number of classes. The reference vectors T(M) are updated so that they always represent the average reference vector of all elements 16 previously assigned to Class M. However, using the holographic correlation techniques described above, the vectors T(M) are replaced with the single-cell correlation patterns 40 whose pattern of dots 36 correspond to the spectral signatures which vectors T(M) represent. Pattern 34 corresponds to a matrix of all the S(I) vectors. The holographic correlation of pattern 34 with correlation pattern 40 produces simultaneously the equivalent of comparing a particular vector T(j) with all the S(J) vectors. The intensity of light dot produced at the center of each resolution cell 24 will be proportional to $C^2$, where C is the correlation sum defined above. As described above, identification of correlations exceeding some minimum value $C_{min}$ is achieved by controlling the development of high-gamma film.

Figure 8:
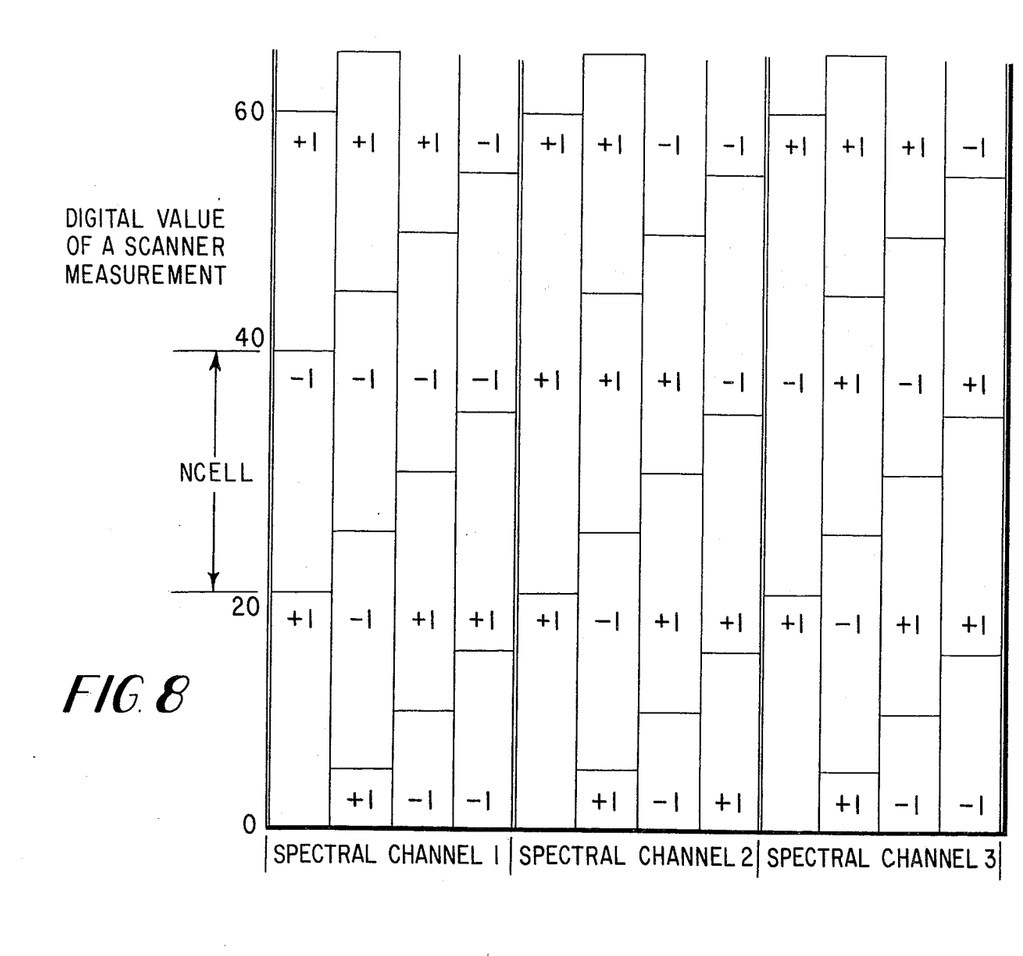
FIG. 8 is a representation of a 3-channel look-up table used in the transformation step of a further embodiment of the method represented in FIG. 1.

With the format of the look-up table just described, each integer is represented by a single +1 or −1 in the array 30 of ±1's. This method is likely to produce good discrimination between classes M only if there is a sufficient number of channels 18 of data for each resolution element 16. For example, the probability of a +1 or a −1 occurring as the transformed value in any single channel 18 of a four-channel scanner is 0.5. As a consequence, a significant correlation over only four channels is possible for some ground resolution elements 16 with vastly different original spectral signatures. This difficulty may be overcome by assigning to each channel measurement (each integer) in an array 30 a random sequence of ± 1's that is characteristic of a particular value of the integer and that has a low correlation with other measurement values that are significantly different therefrom. One method of obtaining the ± 1 sequency is illustrated in FIG. 8 where each of three channels 18 on the matrix graph of the look-up table has been subdivided into four subchannels. In general, the width of each sub-cell remains the same as before, but the sub-cells in each subchannel have been shifted with respect to adjacent sub-cells by an amount NCELL/NSUBCHNL, where NSUBCHNL is the number of subchannels in each cell of the look-up table and NCELL is the width of the cell. The effect of the subchannel division is to increase the number of effective elements which are cross-correlated, thus allowing greater discrimination among similar classes of data when only a few real channels 18 are available for clustering. The selection of the values for NSUBCHNL and NCELL will determine the spectral sensitivity of the resulting classification maps. Large values of NCELL, corresponding to wide cell widths will result in different spectral signatures for elements 16 having the same $n \times n$ array 30 of $\pm$ 1's. Thus large values of NCELL result in classification maps with low spectral sensitivity.

Although the invention has been described relative to exemplary embodiments thereof, it will be understood by those skilled in the art that variations and modifications can be effected in these embodiments without departing from the scope and spirit of the invention.

What is claimed is:

1. A method of producing classification maps from multispectral data comprising the following steps:
 a. transforming multispectral data into a binary format wherein said data is arranged in a predetermined spacial pattern;
 b. encoding the transformed data onto an optical film medium by varying the optical characteristics of the film medium to provide binary coding and preserving said spacial pattern in the transformed data when encoded onto said optical medium; and
 c. holographically correlating the encoded transformed data with correlating data representing a selected spectral signature to produce a single-class classification map, said holographic correlating step comprising the cross correlating of data for a single resolution element of a multispectral element with all of the resolution elements of said scanner and wherein said single-class classification maps are photographed on high gamma photographic film using controlled development so that only light intensities above a predetermined threshold value representing a selected minimum holographic cross-correlating will expose the film and so that above said threshold the light intensities will expose the film in proportion to the value of the intensity, said film being subsequently developed and projected so that the brightness of each spot will be an indication of the degree to which the corresponding resolution element belongs to the particular class.

2. The method of claim 1 further comprising the following steps:
 repeating said holographic correlation step with correlating data representing other selected spectral signatures to produce at least one further single-class classification map, and
 superimposing said at least one single-class classification map on the first mentioned single-class classification map to produce a multi-class classification map.

3. The method of claim 2 wherein different color filters are utilized for different single-class maps to produce resultant full color classification maps.

4. The method of claim 1 wherein said multispectral data comprises a single integer datum for each of a plurality of channels of each of a plurality of ground resolution elements of a multispectral scanner, said resolution elements being arranged in a specific spacial pattern.

5. The method of claim 4 wherein said data transforming step further comprises unsupervised classification of said data to provide a binary array wherein each of said data is represented by a single +1 or −1 value.

6. The method of claim 4 wherein said transforming step further comprises unsupervised classification of said data to provide a binary array wherein each of said data is represented by a sequence of more than one +1 and/or −1 values.

7. The method as claimed in claim 1 wherein said data comprises integer numbers representing measurements in each of the channels of a multispectral scanner and said data transforming step comprises dividing the range of possible integer measurement numbers into predetermined cells wherein each cell contains a subset of the total range, assigning a value of +1 or −1 to each cell at random with equal probability, and assigning cell measurements the value +1 or −1 that is assigned to the cell in which the integer measurement number falls.

8. The method of claim 1 wherein said holographic correlation step comprises a two-step process whereby a hologram is first formed from the encoded transformed data and the correlating data and said single-class map is then produced from said hologram.

9. The method of claim 1 wherein said holographic correlation comprises a single-step process whereby a hologram filter formed from the correlating data is utilized to directly produce said single-class map from the encoded transformed data.

10. The method of claim 1 wherein said encoding step comprises providing transparent and opaque areas on a film medium in accordance with said binary format.

11. The method of claim 1 wherein the phase characteristics of the film medium are varied to provide said binary coding.

* * * * *